United States Patent [19]

Chu

[11] Patent Number: 4,608,355
[45] Date of Patent: Aug. 26, 1986

[54] HYDROCARBON CONVERSION CATALYST

[75] Inventor: Pochen Chu, West Deptford, N.J.

[73] Assignee: Mobil Oil Corporation, New York, N.Y.

[21] Appl. No.: 521,864

[22] Filed: Aug. 10, 1983

[51] Int. Cl.$^4$ .................. B01J 29/06; B01J 20/12
[52] U.S. Cl. ........................................ 502/68; 502/71
[58] Field of Search .......................... 502/67, 68, 71

[56] References Cited

U.S. PATENT DOCUMENTS

| | | | |
|---|---|---|---|
| 2,973,327 | 2/1961 | Mitchell et al. | 502/68 X |
| 3,013,985 | 12/1961 | Breck et al. | 252/455 |
| 3,394,989 | 7/1968 | Drost | 502/68 X |
| 3,449,070 | 6/1969 | McDaniel et al. | 23/111 |
| 3,515,511 | 6/1970 | Flank | 23/112 |
| 3,657,154 | 4/1972 | Haden, Jr. et al. | 502/68 |
| 3,894,934 | 6/1975 | Owen et al. | 208/78 |
| 4,276,438 | 6/1981 | Chu | 585/467 |

FOREIGN PATENT DOCUMENTS 0020154 12/1980 European Pat. Off.
0037168 10/1981 European Pat. Off.
2074602 11/1981 United Kingdom.

Primary Examiner—Carl F. Dees
Attorney, Agent, or Firm—Alexander J. McKillop; Michael G. Gilman; Marina V. Schneller

[57] ABSTRACT

Catalysts of improved strength and activity are formed by compositing a clay matrixing material with a zeolite which contains cations of a Group IB metal, preferably a monovalent metal such as silver. The presence of the cations gives the zeolite improved resistance to the high sintering temperatures necessary to confer adequate strength upon the resulting catalyst.

12 Claims, 1 Drawing Figure

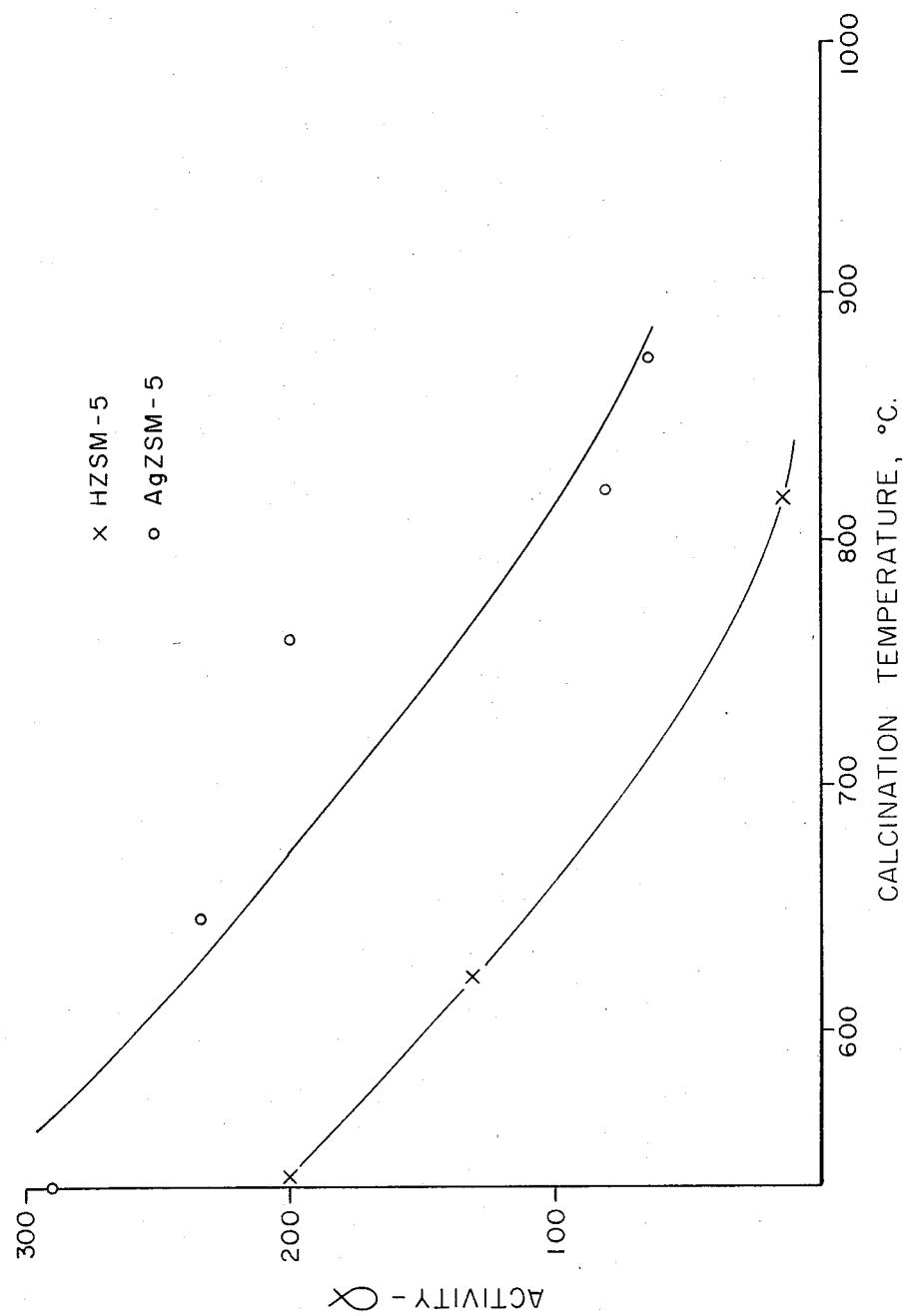

HYDROCARBON CONVERSION CATALYST

FIELD OF THE INVENTION

This invention relates to hydrocarbon conversion catalysts of improved strength and activity that may be used in petroleum refining processes such as cracking.

CROSS REFERENCE TO RELATED APPLICATION

My U.S. patent application Ser. No. 434,442, filed Oct. 15, 1982 (now abandoned), incorporated in this application by reference discloses the use of zeolites containing Group IB cations in reactions where improved hydrothermal stability is desired.

BACKGROUND OF THE INVENTION

A wide variety of hydrocarbon conversion processes encountered in the petroleum refining industry are catalytic in nature and many of them use zeolite catalysts, for example, cracking, as described in U.S. Pat. Nos. 3,700,585 and 3,907,663; hydrocracking as described in U.S. Pat. No. 3,923,641; dewaxing and hydrodewaxing as described in U.S. Pat. Nos. Re. 28,398, 3,700,585, 3,956,102, 4,110,056 and 3,755,138; aromatization processes of the kind described in U.S. Pat. Nos. 3,806,443, 3,767,568, 3,753,891, 3,770,614 and 3,843,740 and alkylation as described in U.S. Pat. No. 3,641,777. They have also been used or proposed for use in a number of petrochemical processes, for example, in alkylation processes of the kind described in U.S. Pat. Nos. 3,668,264, 3,251,897, 4,117,024, 4,049,738 and 4,086,287, isomerization processes of the kind described in U.S. Pat. Nos. 4,100,214 and 4,101,596 and disproportionation processes as described, for example, in U.S. Pat. Nos. 4,106,788 and 3,856,871. Their use in the production of hydrocarbons from other materials such as synthesis gas, methanol, dimethyl ether (DME) or other oxygenated materials is described, for example, in U.S. Pat. Nos. 3,894,102 to 3,894,107, 3,899,544, 4,039,600, 4,048,250 and 4,035,430. In these processes various kinds of zeolites may be used either alone or in combination with one another or with other catalytic materials. Zeolites may be characterized as being small pore materials such as erionite or zeolite A; large pore materials such as zeolite X, zeolite Y or mordenite and the so-called intermediate pore size zeolites exemplified by the ZSM-5 family including ZSM-5 itself, ZSM-11, ZSM-12, ZSM-23, ZSM-35 and ZSM-38.

In some of these processes, the catalyst contains two different types of zeolite. For example, the cracking processes described in U.S. Pat. Nos. 3,578,403, 3,849,291, 3,894,931 and 3,894,934 may employ catalysts which include an intermediate pore size zeolite such as ZSM-5 together with another zeolite, for example, a synthetic faujasite such as zeolite X or zeolite Y.

In many of these processes, the catalyst is required to have a high physical strength in order to resist the stresses which it encounters in use. The catalyst should have good crushing resistance, abrasion resistance and attrition resistance, particularly in processes such as fluid catalytic cracking (FCC) where the catalyst is maintained in a constant state of movement. In order to confer the desired strength, the zeolite is usually incorporated into a binder or a matrix such as a clay, silica, or a metal oxide such as alumina. After the zeolite has been composited with the binder or the matrix, the mixture is usually sintered at a high temperature. Sintered clay matrices confer good physical strength but have the disadvantage that the high sintering temperatures which are necessary tend to destroy the activity and crystallinity and crystallinity of the zeolite. It would therefore be desirable to find some way of preserving the activity and crystallinity of the zeolite while, at the same time, retaining the strength characteristics of the sintered clay composites.

An associated problem which is encountered with the catalyst combinations such as the ZSM-5/faujasite combinations mentioned above is that the combination may require treatment in order to confer a desirable attribute on one of the zeolites but at the same time, this treatment may adversely affect the other zeolite. For example, the ZSM-5/faujasite cracking catalysts need preliminary steaming in order to reduce the cracking activity of the faujasite; the steaming, however, tends to deactivate the ZSM-5 so that it no longer performs its required function of improving product octane number as well. It would therefore, in this case, be desirable to find a way of stabilizing the zeolite so that it may withstand the treatments which it will undergo.

SUMMARY OF THE INVENTION

It has now been found that zeolites may be stabilized by loading the zeolite with a cations of metals of Group IB of the Periodic Table (the Periodic Table used in this specification is the table approved by IUPAC and the U.S. National Bureau of Standards and shown, for example, in the table of the Fisher Scientific Company, Catalog No. 5-702-10). According to the present invention, therefore, the zeolite in a porous clay matrix material contains cations of a Group IB metal, preferably a monovalent metal such as Ag. The resulting catalysts are resistant to the high sintering temperatures which are encountered during the matrixing processes and are also characterized by good hydrothermal stability so that they will be more resistant to preliminary treatments such as steaming, where prolonged exposure to water vapor at high temperatures occurs.

The catalysts according to the present invention are prepared by incorporating the Group IB metal in cationic form into the zeolite, preparing the zeolite clay composite and calcining the composite at high temperature, usually above 600° C.

Catalysts produced by the present process are useful in a variety of processes where physical strength together with the selectivity and activity of a fresh catalyst are desired. They are, for this reason, useful in fluidized bed processes such as fluid catalytic cracking. Also, by reason of their improved hydrothermal stability, they are useful in processes where prolonged exposure to water vapor occurs either in the process itself or in an ancillary process such as regeneration. Processes of this kind include those where water is produced as a by-product of the reaction, for example, in the conversion of oxygenates to hydrocarbons, where water is added to the reaction feed as in reforming or, for example, where hydrocarbons are burned during the regeneration.

BRIEF DESCRIPTION OF THE DRAWING

The single FIGURE of the accompanying drawings is a graph relating catalyst activity to calcination temperature.

DETAILED DESCRIPTION OF THE INVENTION

A wide variety of porous zeolites may be treated by the present stabilization method but the process is especially useful with the large pore zeolites such as zeolite beta and the intermediate pore size zeolites type which have a structural silica:alumina ratio of at least 12:1 and a Constraint Index of 1 to 12. The stabilization has been found to be less effective with the small pore zeolite such as erionite and zeolite A which have pore sizes of less than 5 A°. Large pore zeolites which may be exchanged into the Group B metal form have pore dimensions of at least 6 A° and include, for example, zeolite ZSM-20, zeolite X, zeolite Y, zeolite beta and mordenite. The intermediate pore size zeolites typically have at least one pore dimension from 5 A° to 6 A° but they are more readily characterized by their Constraint Index.

The measuring and significance of the term "Constraint Index" are described in U.S. Pat. No. 4.016,218, to which reference is made for details of the method by which the index is determined and examples of its values for typical zeolite. The Constraint Index is a measure of the extent to which the crystal structure of the zeolite provides restricted access to the internal structure of the zeolite. To this extent, the Constraint Index is related to structure even though its measurement is dependent upon a test which exploits the cracking activity of the zeolite, a property which is in turn dependent upon the possession of acidic sites and acidic functionality by the zeolite. The zeolite sample selected for use in the measurement of the Constraint Index should therefore be representative of the structure of the zeolite whose Constraint Index is to be measured in addition to possessing sufficient cracking activity for the determination to be made. The preferred zeolites having constraint indices within the range of 1 to 12 are ZSM-5, ZSM-11, ZSM-12, ZSM-35 and ZSM-39. The Constraint Indices of these preferred zeolites indicate that the zeolites have structures which provide controlled but not unimpeded access for larger hydrocarbon molecules to the internal structure of the zeolite.

ZSM-5 is described in U.S. Pat. No. 3,702,886; ZSM-11 in U.S. Pat. No. 3,709,979; ZSM-12 in U.S. Pat. No. 3,832,449; ZSM-23 in U.S. Pat. No. 4,076,842; ZSM-35 in U.S. Pat. No. 4,016,245 and ZSM-38 in U.S. Pat. No. 4,046,859, and reference is made to these patents for details of these zeolites, their preparation and properties.

Zeolite ZSM-20 is described in U.S. Pat. Nos. 3,972,983 and 4,021,331 and zeolite beta in U.S. Pat. No. 3,303,069 and Re. 28,341; reference is made to these patents for details of these zeolites, their preparation and properties.

When the zeolites are prepared in the presence of organic cations they are initially catalytically inactive, possibly because the intracrystalline free space is occupied by organic cations from the forming solution. They may be activated by heating in an inert atmosphere at 540° C. for one hour, for example, followed by base exchange with ammonium salts followed by calcination at 540° C. in air. The presence of organic cation in the forming solution may not be absolutely essential to the formation of the zeolite but these cations do appear to favor the formation of the desired crystal structure.

The zeolite is loaded with the Group IB metal, preferably a monovalent Group IB metal such as Ag or Cu (I), in cationic form. The metal may be incorporated into the zeolite by ion-exchange or by impregnation but it has been found that whichever method is used, the metal should be in its cationic form. When the metal is introduced by ion exchange from a solution containing cations of the metal, it will obviously be in the desired form and for this reason, ion exchange is the preferred method of incorporating the metal. On the other hand, if the metal is incorporated into the zeolite by impregnation, it must be converted to the desired cationic form. For example, if the metal is impregnated into the zeolite using a solution of an anionic complex of the metal such as $[CuCl_4]^{2-}$, $Ag(CN_4)^{3-}$, the metal must be converted to the cationic form. This may usually be accomplished by oxidation using a suitable oxidizing agent. The complex anion may, if desired, be first converted to the zerovalent metal e.g. by heating and the metal then oxidized to the required cationic form, e.g. by heating in an oxidizing atmosphere. Similarly, if the cationic form of the metal becomes reduced during use it may be re-oxidized to the cationic form so as to retain the desired stability. Suitable oxidizing treatment for silver is to use an oxidizing atmosphere of oxygen or air at 400° C. to 600° C., preferably 480° C. to 540° C.

The zeolite may be converted to the Group IB metal form by conventional base exchange techniques using, for example, an aqueous solution of the cation of the metal. When the metal cation being introduced into the zeolite is silver, solutions of silver nitrate are useful and preferred. If the metal cation is copper, solutions of copper chloride, copper sulfate or copper nitrate may be used and if the metal cation is gold, solutions of gold chloride are suitable. Methods of incorporating Group IB metals into zeolites of the ZSM-5 type are described in U.S. Pat. No. 4,276,438 and reference is made to that patent for details of such methods and of suitable compounds of Group IB metals for this purpose. Similar cation exchange methods may be employed with other zeolites such as zeolite beta.

Conventional impregnation techniques such as by impregnation with solutions of complex metal anions may be used for introducing the metal in this way as an alternative to exchange with the metal cations.

The metal content of the zeolite should normally be at least 0.1 weight percent, regardless of the method of incorporation, and preferably should be at least 0.5 weight percent for satisfactory stabilization. The maximum loading will be set by the nature of the zeolite and the method by which the metal is incorporated into the zeolite. If ion exchange is used, the maximum loading will be set by the exchange capacity of the zeolite which, in turn, is a function of silica:alumina ratio and since acidic sites will normally be desired in the zeolite in order to confer activity of the proportion of available sites occupied by the metal cations will be appreciably below the total. If the metal is incorporated by impregnation the exchange capacity of the zeolite will impose no fundamental limitation on the loading but other factors e.g. sorption of the metal containing species, may do. The amount of metal incorporated into the zeolite will therefore tend to be of the same order, regardless of the method of incorporation. Generally, the maximum loading will be 10 weight percent and, more usually, not more than 5 weight percent.

Cation exchange with the Group IB metal cations should be sufficient to ensure that 10 percent of the exchangeable sites on the zeolite are in the Group IB metal form and preferably at least 50 percent of the exchangeable sites should be in that form. Exchange to the desired extent can be ensured by conventional techniques such as prolonged exchange, repeated exchange and so on.

It has been found that the degree of improvement in the hydrothermal stability is greater with higher structural silica:alumina ratios in the zeolite. With the large pore zeolites, ratios of at least 20:1 are preferred, especially for zeolite beta and with the intermediate pore size zeolites (Constraint Index of 1 to 12), ratios of at least 40:1.

If the zeolite selected may be produced in the desired highly siliceous form by direct synthesis, this will often be the most convenient method for obtaining it. Zeolite beta, for example, is known to be capable of being synthesized directly in forms having silica:alumina ratios up to 100:1, as described in U.S. Pat. Nos. 3,308,069 and Re 28,341 which describe zeolite beta, its preparation and properties in detail. Zeolite Y, on the other hand, can be synthesized only in forms which have silica:alumina ratios up to about 5:1 and in order to achieve higher ratios, resort may be made to various techniques to remove structural aluminum so as to obtain a more highly siliceous zeolite. The same is true of mordenite which, in its natural or directly synthesized form has a silica:alumina ratio of about 10:1. Zeolite ZSM-20 may be directly synthesized with silica:alumina ratios of 7:1 or higher, typically in the range of 7:1 to 10:1, as described in U.S. Pat. Nos. 3,972,983 and 4,021,331. Zeolite ZSM-20 also may be treated by various methods to increase its silica:alumina ratio.

Control of the silica:alumina ratio of the zeolite in its as-synthesized form may be exercised by an appropriate selection of the relative proportions of the starting materials, especially the silica and alumina precursors, a relatively smaller quantity of the alumina precursor resulting in a higher silica:alumina ratio in the product zeolite, up to the limit of the synthetic procedure. If higher ratios are desired and alternative syntheses affording the desired high silica:alumina ratios are not available, other techniques such as those described below may be used in order to prepare the desired highly siliceous zeolites.

The silica:alumina ratios referred to in this specification are the structural or framework ratios, that is, the ratio for the $SiO_4$ to the $AlO_4$ tetrahedra which together constitute the structure of which the zeolite is composed. This ratio may vary from the silica:alumina ratio determined by various physical and chemical methods. For example, a gross chemical analysis may include aluminum which is present in the form of cations associated with the acidic sites on the zeolite, thereby giving a low silica:alumina ratio. Similarly, if the ratio is determined by thermogravimetric analysis (TGA) of ammonia desorption, a low ammonia titration may be obtained if cationic aluminum prevents exchange of the ammonium ions onto the acidic sites. These disparities are particularly troublesome when certain treatments such as the dealuminization methods described below which result in the presence of ionic aluminum free of the zeolite structure are employed. Due care should therefore be taken to ensure that the framework silica:alumina ratio is correctly determined.

A number of different methods are known for increasing the structural silica:alumina ratio of various zeolites. Many of these methods rely upon the removal of aluminum from the structural framework of the zeolite by chemical agents appropriate to this end. A considerable amount of work on the preparation of aluminum deficient faujasites has been performed and is reviewed in Advances in Chemistry Series No. 121, Molecular Sieves, G. T. Kerr, American Chemical Society, 1973. Specific method for preparing dealuminized zeolites are described in the following, and reference is made to them for details of the method: Catalysis by Zeolites (International Symposium on Zeolites, Lyon, Sept. 9-11, 1980), Elsevier Scientific Publishing Co., Amsterdam, 1980 (dealuminization of zeolite Y with silicon tetrachloride); U.S. Pat. No. 3,442,795 and G.B. 1,058,188 (hydrolysis and removal of aluminum by chelation); G.B. 1,061,847 (acid extraction of aluminum); U.S. Pat. No. 3,493,519 (aluminum removal by steaming and chelation); U.S. Pat. No. 3,591,488 (aluminum removal by steaming); U.S. Pat. No. 4,273,753 (dealuminization by silicon halides and oxyhalides); U.S. Pat. No. 3,691,099 (aluminum extraction with acid); U.S. Pat. No. 4,093,560 (dealuminization by treatment with salts); U.S. Pat. No. 3,937,791 (aluminum removal with Cr(III) solutions); U.S. Pat. No. 3,506,400 (steaming followed by chelation); U.S. Pat. No. 3,640,681 (extraction of aluminum with acetylacetonate followed by dehydroxylation); U.S. Pat. No. 3,836,561 (removal of aluminum with acid); DE-OS 2,510,740 (treatment of zeolite with chlorine or chlorine-contrary gases at high temperatures), NL 7,604,264 (acid extraction), JA 53,101,103 (treatment with EDTA or other materials to remove aluminum) and J. Catalysis 54 295 (1978) (hydrothermal treatment followed by acid extraction).

Highly siliceous forms of zeolite Y may be prepared steaming or by acid extraction of structural aluminum (or both) but because zeolite Y in its normal, as-synthesized condition, is unstable to acid, it must first be converted to an acid-stable form. Methods for doing this are known and one of the most common forms of acid-resistant zeolite Y is known as "Ultrastable Y" (USY); it is described in U.S. Pat. Nos. 3,293,192 and 3,402,996 and the publication, Society of Chemical Engineering (London) Monograph Molecular Sieves, page 186 (1968) by C. V. McDaniel and P. K. Maher, and reference is made to these for details of the zeolite and its preparation. In general, "ultrastable" refers to Y-type zeolite which is highly resistant to degradation of crystallinity by high temperature and steam treatment and is characterized by a $R_2O$ content (wherein R is Na, K or any other akali metal ion) of less than 4 weight percent, preferably less than 1 weight percent, and a unit cell size less than 24.5 Angstroms and a silica to alumina mole ratio in the range of 3.5 to 7 or higher. The ultrastable form of Y-type zeolite is obtained primarily by a substantial reduction of the alkali metal ions and the unit cell size reduction of the alkali metal ions and the unit cell size reduction. The ultrastable zeolite is indentified both by the smaller unit cell and the low alkali metal content in the crystal structure.

The ultrastable form of the Y-type zeolite can be prepared by successively base exchanging a Y-type zeolite with an aqueous solution of an ammonium salt, such as ammonium nitrate, until the alkali metal content of the Y-type zeolite is reduced to less than 4 weight percent. The base exchanged zeolite is then calcined at a temperature of 540° C. to 800° C. for up to several hours, cooled and successively base exchanged with an aqueous solution of an ammonium salt until the alkali metal content is reduced to less than 1 weight percent, followed by washing and calcination again at a temperature of 540° C. to 800° C. to produce an ultrastable zeolite Y. The sequence of ion exchange and heat treatment results in the substantial reduction of the alkali metal content of the original zeolite and results in a unit cell shrinkage which is believed to lead to the ultra high stability of the resulting Y-type zeolite.

The ultrastable zeolite Y may then be extracted with acid to produce a highly siliceous form of the zeolite. The acid extraction may be made in the same way as described above for zeolite beta.

Other methods of increasing the silica:alumina ratio of zeolite Y by acid extraction are described in U.S. Pat. Nos. 4,218,307, 3,591,488 and 3,691,099, to which reference is made for details of these methods.

Zeolite ZSM-20 may be converted to more highly siliceous forms by a process similar to that used for zeolite Y: first, the zeolite is converted to an "ultrastable" form which is then dealuminized by acid extraction. The conversion to the ultrastable form may suitably be carried out by the same sequence of steps used for preparing ultrastable Y. The zeolite is successively base-exchanged to the ammonium form and calcined, normally at temperatures above 700° C. The calcination should be carried out in a deep bed in order to impede removal of gaseous products, as recommended in Advances in Chemistry Series, No. 121, op cit. Acid extraction of the "ultrastable" ZSM-20 may be effected in the same way as described above for zeolite beta.

Highly siliceous forms of mordenite may be made by acid extraction procedures of the kind described, for example, in U.S. Pat. Nos. 3,691,099, 3,591,488 and other dealuminization techniques which may be used for mordenite are disclosed, for example, in U.S. Pat. Nos. 4,273,753, 3,493,519 and 3,442,795. Reference is made to these patents for a full description of these processes.

The zeolite is composited with a porous clay matrix material which is resistant to the temperatures and other conditions employed in the process. The composite is then calcined to confer the required physical strength. Naturally occurring clays can be composited with the zeolite and these clays can be used in the raw state as originally mined or initially subjected to calcination, acid treatment or chemical modification.

Examples of suitable clays which may be used include the sub-bentonite and kaolin families, for example, the Dixie, McNamee-Georgia and Florida clays and other in which the main mineral constituent is halloysite, kaolinite, dickite, nacrite or anauxite. Other clays may also be found to be suitable for use in the present process.

The amount of clay relative to zeolite in the composite will determine, to a certain extent, the physical strength of the final catalyst, especially its attrition resistance and crushing strength. The mechanical properties of the catalyst can therefore be modified by appropriate choice of clay/zeolite ratio, with greater amounts of clay generally conferring better mechanical properties. On the other hand, larger amounts of clay mean that less of the zeolite with its desired, attendant properties will be available to participate in the eventual reaction. A balance will therefore be struck, in most cases, between activity and mechanical properties. Normally, the amount of zeolite will not exceed 50 percent by weight of the composite and in most cases it will not exceed 40 percent by weight and may be lower e.g. 25 percent by weight or even 15 percent by weight. The increased strength conferred by the use of the Group IB metals permits the amount of zeolite to be increased beyond what it otherwise might be e.g. if the maximum content of zeolite in the hydrogen form is no greater than 25 percent, it may be possible to increase it to 40 percent if the zeolite is loaded with the Group IB metal.

The zeolite may conveniently be composited with the clay matrix material by forming an aqueous slurry of the zeolite or zeolites containing the IB metal with the clay, spray drying the slurry to form microspheres and then calcining. The zeolite may be in the form of a gel. If the catalyst is to include more than one zeolite, the zeolites may form a cogel with themselves. If one of the zeolites in the zeolite combination is capable of being produced by treatment of a clay, the zeolite may be composited with the clay slurry and the slurry spray dried to form solid zeolite/clay microspheres which are then calcined to confer the desired strength. The clay in the composite may then be converted to the zeolite in the conventional way, e.g. by treatment with sodium hydroxide and heating, followed by ion-exchange, if desired. The mixing and homogenizing steps which may be used in the preparation of the zeolite/matrix mixtures are conventional and need not be described; the spray drying may also be carried out in the conventional manner.

A suitable method for preparing a zeolite in situ in a porous clay matrix material is disclosed in U.S. Pat. No. 3,657,154 to which reference is made for details of the method. That method may be adapted for use in preparing combination zeolite catalysts by including the Group IB containing zeolite in the clay slurry prior to the spray drying step used to form the microspheres. After the faujasite has been formed by treatment of the clay, it may be base exchanged to bring it into the desired form. Another method for forming a faujasite from a calcined clay is described in U.S. Pat. No. 3,515,511, to which reference is also made for details of the method. This method is particularly suitable for forming faujasite/ZSM-5 type composites containing Group IB metal cations by including the Group IB containing zeolite in the clay prior to the treatment for producing the faujasite. Composites of this kind are particularly useful in cracking operations.

The calcination or sintering step which is used to confer the desired physical strength is generally carried out at high temperatures above 600° C. (about 1100° F.) and, in most cases, above 700° C. (about 1300° F.). Usually, the calcination temperature will not exceed 980° C. (about 1800° F.). As mentioned in my co-pending U.S. patent application Ser. No. 434,442 filed Oct. 15, 1982, the calcination treatment has been found to affect the zeolite in different ways, depending upon the oxidation state of the metal on the zeolite. If the Group IB-containing zeolite is calcined, the stability generally declines gradually, with the peak being obtained at calcination temperatures of about 540° C. The decline in stability, measured by the alpha value before and after steaming, becomes sharper at calcination temperatures above about 870° C. and such temperatures should therefore be avoided during calcination; temperatures of 500° C. to 700° C. are preferred for calcining the zeolite when in this form. On the other hand, if the IB containing zeolite is first reduced, for example, by treatment with hydrogen, the stability (as measured by the activity, alpha) exhibits a peak at calcination temperatures from 750° C. to 875° C., with a marked decline at higher values. This temperature range (750° to 875° C.) is preferred when the catalyst is used in applications where reducing atmospheres are predominant. By contrast, hydrogen forms of the zeolite exhibit a monotonic decrease with increasing calcination temperature, at a lower level of stability to that of the Ag-exchanged forms of the same zeolite. In all cases, extremely high calcination temperatures above about 900° C. lead to destruction of the crystal structure of the zeolite and consequent loss of activity.

The stability of the zeolite may to hydrothermal reaction conditions conveniently be determined by measuring the cracking activity, alpha, of the zeolite before and after steaming. A method for determining alpha is found in U.S. Pat. No. 4,016,218 and J. Catalysis Vol. VI, 278–287, 1966 and reference is made to these for details of the method.

The zeolite containing the Group IB metal cations, preferably silver cations, exhibits improved hydrothermal stability, that is, it is more resistant to the deleterious effects of exposure to steam (water vapor) at elevated temperatures. The zeolite in this form is therefore useful in catalytic processes in which it is continuously or repeatedly subjected to exposure to steam. Processes of this kind include those in which water in the form of steam is obtained as a by-product of the reaction which is being catalyzed by the zeolite and, on the other hand, those in which the exposure to the steam occurs in an ancillary process such as stripping or regeneration. Frequent, continual or continuous exposure of this kind, which quickly brings about a degradation of the crystal structure of the zeolite is to be distinguished from processes where any exposure to steam takes place at extended intervals of time, for example, during the regeneration of a zeolite catalyst used in an alkylation process of the kind described in U.S. Pat. No. 4,276,438 where regeneration takes place at approximately yearly intervals. The proportionately brief exposure to steam which takes place during regeneration at such extended intervals usually works no substantial harm upon the zeolite and is, by contrast, unobjectionable and poses no problem.

The most severe service, in terms of the zeolite's ability to withstand exposure to steam, is encountered in processes where water in the form of steam is encountered as a by-product of the reaction which is being catalyzed by the zeolite. Processes of this kind include, in particular, those in which an oxygenated starting material such as methanol, dimethyl ether (DME) or ethanol is being converted to a hydrocarbon. Processes of this kind are described, for example, in U.S. Pat. Nos. 3,894,102, 3,894,103, 3,894,104, 3,894,105, 3,894,106, 3,894,107, 3,899,544, 3,907,915, 4,039,600, 4,048,250, 4,035,430, 3,928,483, 3,998,898, 4,039,600, 4,035,430, 4,188,336 and British Pat. Nos. 1,495,794 and 1,489,357.

Less severe conditions of service are encountered when the exposure to water vapor at elevated temperatures is continual i.e. in succession at repeated short intervals, as in fluid catalytic cracking where the catalyst is repeatedly circulated from the cracker to the regenerator with steam stripping in each cycle. The stabilizing effect of the Group IB metal cations is also of advantage in operations of this kind, especially in catalytic cracking processes.

The invention is illustrated by the following Examples in which all parts, proportions and percentages are by weight unless the contrary is stated.

EXAMPLE 1

A sample of NH$_4$ZSM-5 (2000 g., zeolite silica:alumina ratio of 70:1) was cation exchanged with 10 1 0.1N AgNO$_3$ solution at 25° C. for 4 hours, after which the exchanged zeolite, containing 1.4 weight percent silver was washed with water until the washings were free of silver. Samples of the AgZSM-5 were then calcined in an open dish for 3 hours at ranging temperatures. For comparison, samples of the original HZSM-5 were also calcined in the same way. After calcination, the alpha activities of the zeolites were determined. The results are shown in the FIGURE and demonstrate the stabilizing effect of the silver ion on the zeolite at the high sintering temperatures which are encountered during formation of the zeolite/clay composites.

EXAMPLE 2

ZSM-5 in the silver forms (90% solids, 2 kg.) was prepared by the cation exchange procedure described in Example 1 and was then dispersed in 4 kg. of water. Kaolin clay of W-P grade was added to the mixture with agitation to give a clay/AgZSM-5 ratio of 60:40. Sodium silicate (Q-Brand—trademark, 0.23 kg.) was also added to the dispersion. The entire mixture was homogenized using a Cowler mixer to obtain a uniform slurry, after which the mixture was spray-dried into microspheres in the size range of 20–100 microns. Portions of the product were heat treated at 540° C., 650° C., 730° C., 815° C., 1010° C. for 3 hours in air and then tested for packed density and crystallinity. The results are shown in Table 1 below together with the results obtained with clay/HZSM-5 microspheres obtained in the same way but using NH$_4$ZSM-5 as the starting material.

TABLE 1

| Clay/ZSM-5 Catalysts | | | | | |
|---|---|---|---|---|---|
| Calcination Temp., °C. | 540 | 650 | 730 | 815 | 1010 |
| HZSM-5/Clay: | | | | | |
| Packed density, g. cc.$^{-1}$ | 0.76 | 0.74 | 0.73 | 0.73 | 0.70 |
| Crystallinity, percent | 45 | 40 | 20 | 25 | tr |
| AgZSM-5/Clay: | | | | | |
| Packed density, g. cc.$^{-1}$ | 0.77 | 0.74 | 0.75 | 0.74 | 0.73 |
| Crystallinity, percent | 45 | 40 | 40 | 35 | 30 |

The results above show that the AgZSM-5/clay composites are more resistant to the high sintering temperatures necessary to confer adequate strength than the HZSM-5 composites.

EXAMPLE 3

CU(II)ZSM-5 was prepared by exchanging with NH$_4$ZSM-5 of Example 1 (zeolite silica:alumina ratio 70:1) with an aqueous solution of Cu(NO$_3$)$_2$. The exchanged zeolite was then washed and dried; the washed, dried CU(II)ZSM-5 was found to contain 1.1 wt. % of Cu.

Forty parts of the CU(II)ZSM-5, 60 parts of kaolin Kaopaque-trade mark-grade), 5 parts of sodium silicate (Q-Brand-trade mark) and 100 parts of water were composited to form a homogenous mix which was then dried and sized to 14/25 mesh size catalyst (U.S. Standard Sieve Series).

Small portions of the above catalyst were calcined separately in air for three hours at temperatures of 540°, 650°, 730°, 815° and 1010° C. The X-ray crystallinities and alpha cracking activities of these catalyst were then measured.

The dried and sized CU(II)ZSM-5 catalyst was also treated with a CO:NH$_3$ gas mixture (5:1 mole ratio) at 510° C., 3 V/V catalyst for 2 hours. This treatment is to convert the Cu(II) to the Cu(I) state (cf. J. Cat. 61, 467–476 (1980)).

The resultant catalyst was calcined and tested in the same way as the Cu(II)ZSM-5 described above.

The results are shown in Table 2 below, together with the results of the corresponding HZSM-5 catalyst.

TABLE 2

| Clay/CuZSM-5 Catalyst | | | | | |
|---|---|---|---|---|---|
| Calcination Temp, °C. | 540 | 650 | 730 | 815 | 1010 |
| Cu(II)ZSM-5/Clay | | | | | |
| Crystallinity, % | 40 | 30 | 30 | 25 | 20 |
| Alpha | 53 | 43 | 41 | 39 | 10 |
| Cu(I)ZSM-5/Clay | | | | | |
| Crystallinity, % | 40 | 40 | 30 | 30 | 30 |
| Alpha | 63 | 53 | 46 | 39 | 9 |
| HZSM-5/Clay | | | | | |
| Crystallinity, | 45 | 40 | 20 | 25 | tr. |
| Alpha | 58 | 13 | 2.9 | 1.9 | 0.4 |

I claim:

1. A method of forming a calcined zeolite containing catalyst, which comprises treating the zeolite, having exchangeable sites, with a source of a Group IB metal cation in an amount sufficient to insure that at least 10 percent of the exchangeable sites are Group IB metal cation exchanged;

forming a composite of said exchanged zeolite with a clay matrixing material, in which the zeolite does not exceed about 50 percent by weight of the composite; and calcining the composite at a temperature above 600° C., whereby the alpha value of the composite after calcination is greater than that of a calcined mixture of said clay matrixing material and the zeolite.

2. The method of claim 1, wherein said zeolite is ZSM-5, ZSM-11, ZSM-12, ZSM-20, ZSM-35, ZSM-39, zeolite X, zeolite Y, zeolite Beta or mordenite.

3. The method of claim 2, wherein said Group IB metal is copper or silver.

4. The method of claim 1, wherein the zeolite is characterized by a constraint index of about 1 to about 12.

5. The method of claim 4, wherein the Group IB metal is copper or silver.

6. The method of claim 5, wherein the Group IB metal is silver and the zeolite is ZSM-5 whereby the alpha value of the composite is a function of calcination temperature as shown in FIGURE.

7. The method of claim 5, wherein the Group IB metal is copper and the zeolite is ZSM-5.

8. A method according to claim 1 in which the catalyst comprises at least two zeolites one of which is formed in situ by treatment of the clay matrix composited with the other zeolite.

9. A method according to claim 1 in which the zeolite is formed into a composite with the clay matrixing material by forming a slurry of the zeolite with the clay matrixing material and spray drying the slurry.

10. A clay matrixed zeolite catalyst of improved strength and activity which comprises a calcined, porous composite of clay matrix and an aluminosilicate zeolite containing Group IB metal cations, the composite having superior strength to a similar composite of the hydrogen form zeolite.

11. A catalyst according to claim 10 in which the Group IB metal is Ag.

12. A catalyst according to claim 18 in which the zeolite is an intermediate pore size zeolite.

* * * * *